July 15, 1969  R. H. ADLER ET AL  3,455,294
RESPIRATORY DEVICE

Filed Feb. 25, 1966  2 Sheets-Sheet 1

INVENTORS
RICHARD H. ADLER &
JOHN K. WHITNEY
BY
ATTORNEY

July 15, 1969  R. H. ADLER ET AL  3,455,294
RESPIRATORY DEVICE

Filed Feb. 25, 1966  2 Sheets-Sheet 2

INVENTORS
RICHARD H. ADLER &
JOHN K. WHITNEY
BY
ATTORNEY

United States Patent Office 3,455,294
Patented July 15, 1969

3,455,294
RESPIRATORY DEVICE
Richard H. Adler, 123 Livingston Parkway, Snyder, N.Y. 14226, and John K. Whitney, Lenneys Lane, Orchard Park, N.Y. 14127
Filed Feb. 25, 1966, Ser. No. 530,092
Int. Cl. A61h 31/00
U.S. Cl. 128—25    2 Claims

ABSTRACT OF THE DISCLOSURE

A device for treating or preventing respiratory complications comprising a multiwalled chamber of about 1 liter volume providing a tortuous pathway between a mouthpiece and exterior air.

---

This invention relates to a device developed for the prophylaxis and therapy of atelectasis by inducing increases in the depth and volume of respiration of the patient.

It is well recognized that pneumonia and varying forms of pneumonitis are associated with areas of atelectasis throughout the lung. At times, it may be impossible to draw a sharp distinction between phases of atelectasis and pneumonitis. In fact, it is widely held that pneumonitis begins with atelectasis.

The classical form of atelectasis, or partial collapse of a part of a lung, has been associated with inadequate ventilation, ineffective cough, and bronchial obstruction with mucus. Findings such as fever, rapid pulse, and loss of lung aeration on chest X-ray commonly drew the clinician's attention to the presence of one or more areas of established atelectasis.

Quite recently, however, the medical profession has become aware of a newly recognized form of atelectasis; one that lacks the ominous clinical features of the more advanced and recognizable form mentioned above. This new atelectasis consists of small diffuse miliary areas of nonaerated lung that are essentially unrelated to bronchial obstruction. This widespread early form of atelectasis is related to failure to inspire deeply. These pulmonary changes have also been shown to develop when an individual ventilates spontaneously or artifically at a constant tidal volume. Of great practical importance is the fact that this early form of atelectasis can be reversed by the subject taking several deep breaths. People normally sigh or take a breath deeper than their resting tidal volume six to ten times an hour.

The normal sighing mechanism and the ability to respire deeply are suppressed by a wide variety of conditions such as pain, drugs, immobility, surgery, trauma, obesity, old age, etc. The need for means to promote increased ventilation so as to avoid the serious cycle of atelectasis—pneumonia—further respiratory complications, is attested to by the number of methods that have been tried to improve ventilation. Despite the development of artificial ventilators and other devices and modalities for promoting proper ventilation, atelectasis remains a matter of major concern.

Because carbon dioxide is the normal stimulus to deep respiration, a number of schemes have been devised for having the individual inhale an increased concentration of carbon dioxide. Rebreathing into a paper bag is unsatisfactory because of its small volume and imperfect fit on the face. Rebreathing from a tank of 5% carbon dioxide mixture using a face mask causes increased ventilation, but it is cumbersome, expensive, and not practical in most hospitals.

This invention eliminates the aforementioned disadvantages by increasing the concentration of carbon dioxide inhaled by adding to the respiratory tract an area of dead space through which the patient rebreathes. By rebreathing part of his own exhaled air with its higher carbon dioxide content, the individual is passively stimulated to breathe deeper. This rebreathing device is easily managed by patients without need for scarce nursing help or costly accessories.

Accordingly, an object of this invention is to eliminate disadvantages of past methods of increased carbon dioxide inhalation by providing an improved device for increasing the effective tidal volume of a patient. Effective coughing is frequently encountered after use of this device. The device is also effective in treating more advanced atelectasis and pneumonitis.

A further object is to provide a light-weight, compact, easily handled, medically clean and appealing respiratory device.

Another object is to provide an attached nose clip for use with the device and a comfortable snug-fitting plastic mouthpiece which permits an air-tight seal around the mouth.

Another object is the provision of a respiratory device which is quickly assembled and is adapted for easy alteration of the desired volume of dead space air.

A further object is to provide a respiratory rebreathing device which can be adapted for ancillary functions such as the insufflation of medicaments and cough stimulators, and for ready attachment to other devices such as various types of mouthpieces, masks, and tracheostomies.

The foregoing objects are achieved in one aspect of the invention by the provision of a rebreather dead air space device adapted for the prophylaxis and treatment of atelectasis and associated respiratory complications. This device comprises a plurality of spaced walls within a chamber, each wall having an opening remotely located from openings in the other walls. A mouthpiece is also provided with an opening into the chamber. The walls and openings are formed and located to provide a torturous path for air flow from the device exterior to the patient through the mouthpiece. The air space volume in the torturous path is sufficient to raise the carbon dioxide content of the respired air to induce substantial increases in the respiratory tidal volume. If desired, the device may be provided with access ports for medicaments. Further, the construction can take a number of forms including those which allow the dead air space volume to be easily altered by utilizing releasably engaging parts.

For a better understanding of the present invention, together with other and further objects, advantages, and capabilities thereof, reference is made to the following disclosure and appended claims in connection with the accompanying drawings in which:

Figure 1:
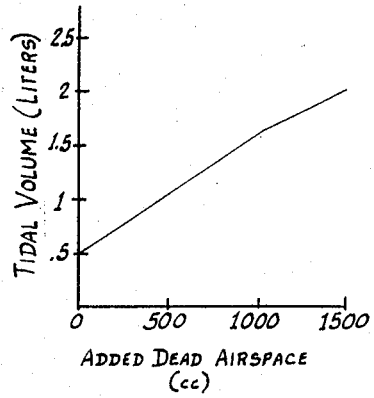
FIG. 1 is a graph illustrating the typical rise in tidal volume with the addition of dead air space.

As pointed out above, the treatment and prophylaxis of atelectasis can be effected by periodic use of the rebreathing device which by virtue of its added dead space causes increased depth of ventilation and an occasional cough. FIGURE 1 illustrates the relationship between added dead air space and the tidal volumes of a subject patient. It can be seen that this relationship is roughly linear. For example, the tidal volume is more than doubled with the addition of one liter (1000 cc.) of dead air space. Although further increase in tidal volume can be affected by additional increase in dead air space, more noticeable breathing effort is required by the patient, and the individual tends to discontinue using the rebreather short of the desired three to five minute rebreathing time. A dead air space approximately one liter has been found to produce the most satisfactory results in the average adult patient. It should also be emphasized that the hyperventilation is largely accomplished by progressively deeper inspirations with little increase in actual respiratory rate per minute—a very desirable feature.

Figure 2:
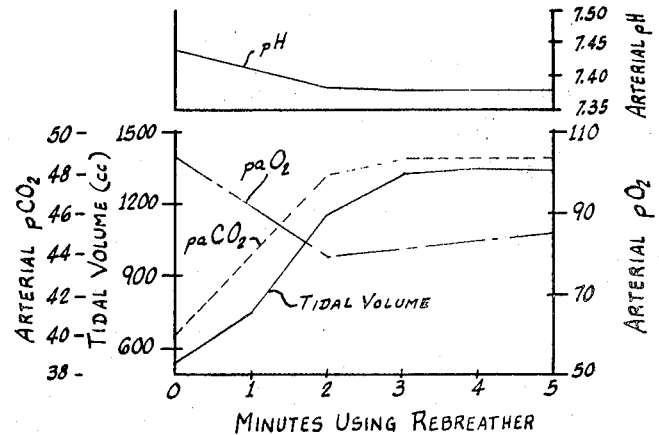
FIG. 2 is a graph showing the relationship between the gas content and pH of the arterial blood and the tidal volume.

The hyperventilation is due to the stimulating effect of the increased arterial carbon dioxide pH on the sensitive respiratory center of the brain. The temporary rise in blood arterial carbon dioxide content is the result of increased carbon dioxide content in the lungs and bronchi resulting from the added dead air space. FIGURE 2 shows graphically the almost parallel elevations in arterial blood carbon dioxide content ($pCO_2$) and tidal air volume when this rebreather with one liter of dead air space is used. It is interesting to note that after three minutes there is essentially no further rise in carbon dioxide tension or tidal air volume. One or two very deep breaths of more than triple the resting tidal air volume are commonly seen per minute, but these extremely beneficial inspiratory efforts are not evident on the graph represented in FIG. 2.

Note also that there is an initial fall in the arterial oxygen content ($pO_2$) that gradually returns toward normal during the rebreathing period. This temporary mild hypoxia is of no practical significance in most individuals. In the occasional patient in whom the physician wishes to avoid the hypoxia, oxygen can be added through a catheter inserted into the distal end of the rebreathing device. It has been shown that an oxygen flow rate of 3 or 4 liters per minute prevents any fall in arterial blood content, but the rise is arterial carbon dioxide and increase in tidal volume are the same as shown in FIG. 2 rebreathing room air without added oxygen. This lends further support to the fact that the hyperventilation is related to the elevated blood carbon dioxide content.

Figure 3:
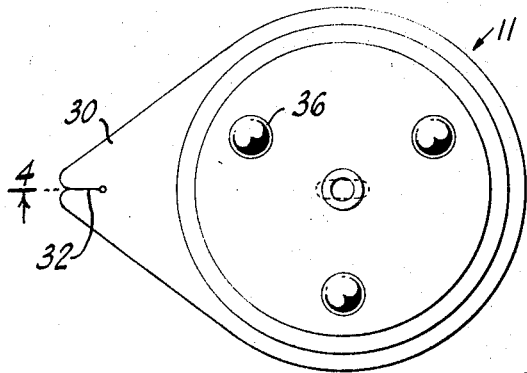
FIG. 3 is a plan view of a respiratory device employing the invention.
Figure 4:
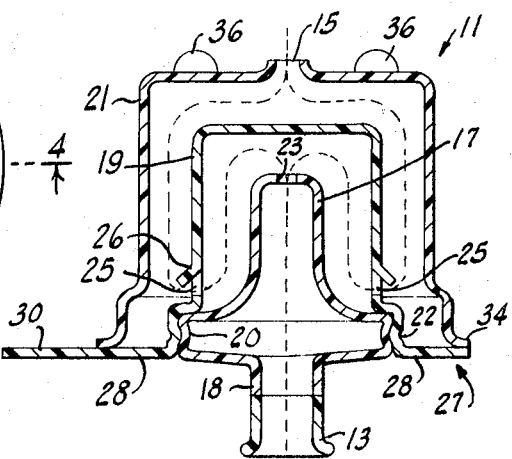
FIG. 4 is a view taken along line 4—4 of FIG. 3.

One form of an economical, compact, medically clean device providing the required dead air space for the patient is shown in FIGS. 3 and 4. The device may be made of plastic or other suitable material which is preferably lightweight, substantially impervious to air and non-toxic. The dead air space is provided by a torturous pathway shown in dotted lines from mouthpiece 13 to the atmosphere opening 15. The pathway is defined by the spaced walls of substantially cup-shaped members 17, 19, and 21, shown inverted, which are formed with successively greater heights from base 27.

Member 17, which may be blow molded, is formed with an opening 23 at one end and an integral neck 18 with the attached mouthpiece 13 at the other end. A channel 20 is formed in member 17 for engaging member 19.

Cup-shaped member 19 is provided with a plurality of circumferentially spaced dimples 22 for snap fitting into channel 20 of member 17 to form a substantially airtight mounting. A number of spaced peripheral openings 25 are provided in member 19 preferably by cutting and hot forming flaps 26 to maintain them in the displace position as shown. A peripheral flange 28 extends outwardly from the bottom of member 19 and has an enlargement 30 adapted to serve as a handle. Slot 32 is formed in the enlargement to receive and retain a cord for a nose clamp or plug, shown in FIG. 8.

Member 21 forms part of the chamber housing and is provided with a peripheral flange 34 which is hermetically sealed to flange 28. These sealed flanges form base 27.

The distal opening 15 to the atmosphere is formed on the opposite end of member 21, together with several spaced feet 36. When not in use, device 11 can be stood upright on feet 36.

It can be seen that the dead air space volume included in the respiratory pathway from the mouthpiece to the atmosphere is formed by the spaced walls and successive remote locations of the openings therethrough. The dimensions of the cup-shaped members are such that about 1000 cc. of space is provided by the device. This volume was selected for the standard device with attached mouthpiece because it at least doubled the resting tidal volume, and it was well accepted by patients. While using the rebreather, many patients are stimulated periodically to inhale in depths more than three times that of the resting tidal volume. This deep breath corresponds to the periodic occurrence seen in the breathing pattern of normal individuals, and it effectively prevents the onset of atelectasis. The deep breathing returns the abnormal pulmonary ventilation-peyusion ratio and the decreased compliance of the lung to normal. Established atelectasis and pneumonitis are also benefited by the hyperventilation, and the associated coughing dislodges impacted mucus from the bronchi thereby opening the airway to the lung distally.

There have been no untoward reactions seen from the use of this device. Instructions state that it is to be used for three to five minutes at hourly intervals. The attached nosepiece is easily managed by the patient and does not necessitate the presence of another person to hold the nostrils shut or to apply one of the more complicated nosepieces in general use. It is not generally appreciated that air leaks through the nostrils or around the mouthpiece prevent any increase in ventilation. The nosepiece and mouthpiece of this device are carefully devised to minimize the unsuspected airleaks so commonly seen with other devices used for this purpose. During therapy, the patient simply breathes through the mouthpiece 13 as described with the nostrils closed. The attached handle 30 helps the patient hold the device in position.

Most important is the fact that the device can be easily used by all but the most debilitated patients without need for repeated nurse or doctor help. It sets conveniently on the bedside table where it is within easy reach of the bedridden patient. The attached nosepiece and plastic mouthpiece provides a pleasing compact device that can be correctly used even by careless and less intelligent patients.

It was found through experimentation that the openings in the walls of device 11 should be of such a size as to reasonably compromise between the requirements of low back pressure and high air velocity. While the openings should be small enough to provide relatively high air velocity and turbulence, they should not be so small that a troublesome back pressure is created. Some patients have indicated difficulty respiring through devices having a back pressure greater than about 2 centimeters of water. Further, it was found that the size and locations of the wall openings have a bearing on the dead air space function of the device. This is probably due to the fact that adequate air flow and flushing are needed to fully utilize the dead air space provided in the respiratory pathway.

Figure 5:
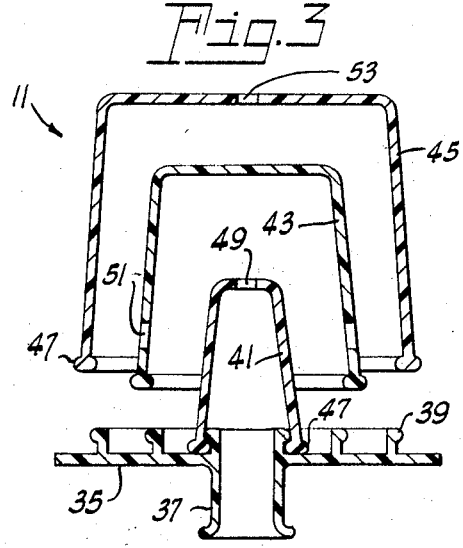
FIG. 5 is an exploded view of a modification of the device shown in FIG. 4.

FIG. 5 shows a modification of device 11 which has the feature of releasably engaging members, thereby providing ease of assembly and alteration of the total dead air space as desired. The drawing illustrates an exploded view to better illustrate the features of economy and simplicity. A base 35 is provided with mouthpiece 37 and a plurality of concentric ribs 39. Spaced members 41, 43, and 45 having successively greater heights are each provided near their ends with complementary engaging means 47 formed to snap over ribs 39. As in device 11 shown in FIG. 4, the walls of the members are provided with sequentially remotely located openings 49, 51, and 53 in the tortuous respiratory pathway from mouthpiece 37 to the atmosphere. The number of members pressed into place on base 35 will determine the dead air space which will be utilized for any given patient. Mouthpiece 37, base 35 and ribs 39 preferably are made of plastic. If desired, members 41, 43, and 45 may comprise conventional paper cups into which the appropriate openings are provided.

Figure 6:
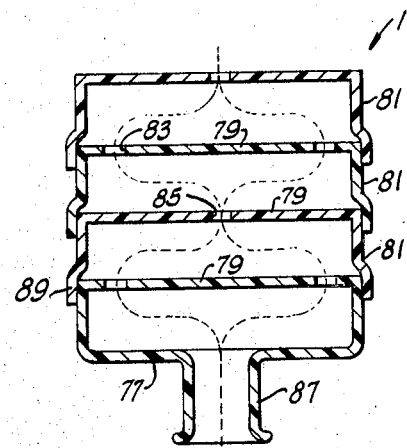
FIG. 6 shows another form of the device.

Another embodiment of the invention is shown in FIG. 6. Here, device 11 is formed by sections stacked upon base member 77. Each section has a wall 79 and a skirt 81. The sections preferably are selected so that they alternately have peripheral openings 83 and central openings 85 to form the torturous path from mouthpiece 87 to the atmosphere. The lips 89 on the edges of skirts 81 allows each section to be forced over the top of the next preceding section to provide a reasonably air-tight frictional engagement. Here again, any number of sections can be employed in accordance with the volume of dead air space required.

The respiratory devices illustrated above are all provided with a mouthpiece. However, it is to be understood that the invention contemplates the application of such a dead air space unit in a respiratory pathway including, for instance, an auxiliary conduit such as a tracheotomy tube. In this case, an adaptor could be formed as a tube for attachment to the device neck to interconnect the device and conduit for patients who are required to breathe directly through the conduit leading into the trachea. Also, because of the condition of some patients, it may be desirable to use a mouthpiece or face mask. In such an event, the adaptor or conduit between the patients pulmonary tract and the dead air space device can be modified as needed without departing from the scope of the invention.

Figure 7:
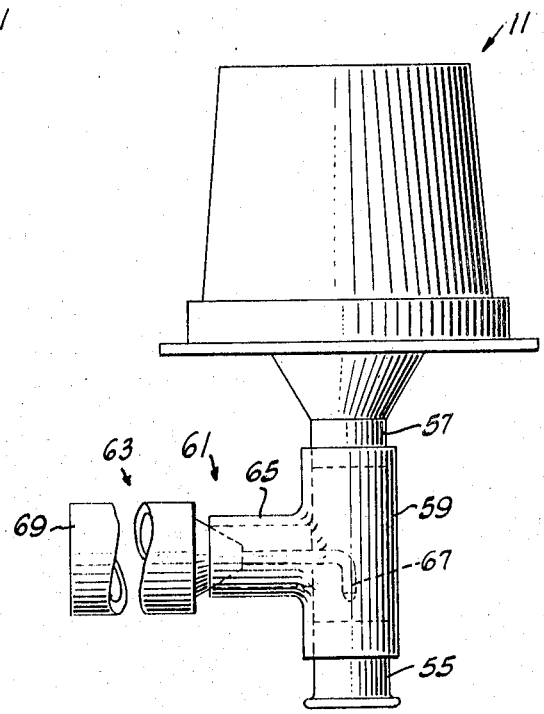
FIG. 7 shows a still further modification of the invention.

Referring to FIG. 7, device 11 may comprise any type of dead air space structure contemplated by this invention. The modification provided herein resides primarily in the provision of a vapor entrance port into the respiratory pathway. For instance, alteration is made of mouthpiece 55 which is attached to neck 57 by means of a sleeve 59 which telescopes thereover. The sleeve 59 has incorporated therein medicament dispenser attaching means 61 which is formed to cooperatively engage a medicament dispenser 63, and which, in this instance, is shown as a projecting tubular portion 65. The integral structure is formed as a T connection. The medicament dispenser 63, preferably of the aerosol veriety having a self-regulating dosage, is operatively mounted with the attaching means 61, as by frictional engagement of the valve thereof with the outermost end of tubular portion 65. This arrangement positions the nozzle 67 of the dispenser 63 within sleeve 59 and allows the dispenser to be operated by pressure being exerted at a location remote from the valve engagement, such as at the distal end of medicament reservoir 69, and allows a medicament vapor to be insufflated into into the respiratory tract as shown in the drawing. This is a desirable feature when the patient is to be administered medicaments such as broncho-dilatants, mucolytics, antibiotics and cough simultants. It is to be understood that the medicament adaptor illustrated could take other forms. Further, the application of the medicament could be introduced through a part located in other sections of the respiratory pathway.

Figure 8:
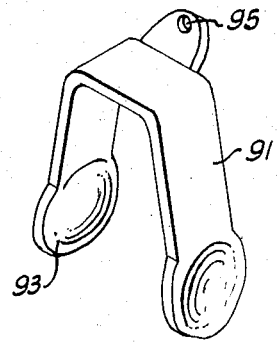
FIG. 8 illustrates a nose clip adapted for use with the device.

FIG. 8 illustrates a nose clip 91 which is adapted to be used with the respiratory device 11. Preferably, the clip is made of soft metal so that it can be pinched together to close the nose through pressure extended by protrusions 93 upon the patient's nostrils. For convenience, a cord (not shown) can be fastened to the clip through aperture 95 for attachment in slot 32 of device 11.

The apperance of the device, its light weight and ease of use makes it readily acceptable to patients. It has been found beneficial to have the patient begin using the device a day or more before surgery so that he may become familiar with it and thereby reassured of its action. This alloys apprehension and decidedly improves the depth of breathing when used hourly following surgery.

It can be seen from the above description that the invention provides a device for the prophylaxis and treatment of actelectasis which is much improved over devices previously used for this purpose.

What is claimed is:

1. A device adapted for the prophylaxis and treatment of atelectasis and associated respiratory complications by increasing a patient's respiratory tidal volume comprising: a plurality of members, all being substantially cup-shaped, with the walls thereof positioned and spaced to provide a plurality of internal chambers, a mouthpiece connected to the innermost chamber and having an opening leading thereinto, an exterior opening in the outermost chamber wall, and restricted openings located in the chamber, walls to provide a torturous pathway for air flow from the exterior of said device to a patient through the mouthpiece, at least some of said walls further having closure skirts with engagement means formed to snap-interlock with complementary engagement means to securely mount said members relative to one another, the air space volume provided by said torturous path being sufficient to raise the carbon dioxide content of the respired air and arterial blood to induce substantial increases in the respiratory tidal volume.

2. A device formed in accordance with claim 1 wherein the air space volume provided by said torturous pathway is about 1 liter and the restricted openings in said chamber walls are formed to provide a back pressure not greater than about 2 centimeters of water.

References Cited

UNITED STATES PATENTS

| | | | |
|---|---|---|---|
| 1,044,367 | 11/1912 | Evans | 128—25 |
| 2,007,330 | 7/1935 | Hicks | 128—202 |
| 2,450,610 | 10/1948 | Pierce | 128—147 |
| 2,610,038 | 9/1952 | Phillips | 128—202 |
| 3,097,642 | 7/1963 | Russell | 128—202 |

CHARLES F. ROSENBAUM, Primary Examiner

U.S. Cl. X.R.

128—202